United States Patent [19]

Trecek

[11] 4,018,751
[45] Apr. 19, 1977

[54] CONTINUOUS PROCESS FOR AMINOAZOBENZENE

[75] Inventor: James Bryan Trecek, Somerville, N.J.

[73] Assignee: American Cyanamid Company, Stamford, Conn.

[22] Filed: Apr. 9, 1975

[21] Appl. No.: 566,594

[52] U.S. Cl. .................... 260/205; 260/140 P; 260/144
[51] Int. Cl.² .................. C07C 107/06; C09B 29/08
[58] Field of Search ............... 260/205, 144 P, 141

[56] References Cited

UNITED STATES PATENTS

| 2,538,431 | 1/1951 | Shulman | 260/205 |
| 2,809,964 | 10/1957 | Baggenstoss et al. | 260/205 |
| 3,423,391 | 1/1969 | Kindler et al. | 260/141 |

FOREIGN PATENTS OR APPLICATIONS

| 580,083 | 7/1959 | Canada | 260/205 |

OTHER PUBLICATIONS

Kaeppler et al., Chemical Abstracts, vol. 76, No. 72205n, (1972).

*Primary Examiner*—Floyd D. Higel
*Attorney, Agent, or Firm*—John L. Sullivan

[57] ABSTRACT

An efficient, continuous process for the manufacture of aromatic aminoazo compounds from aromatic primary amines is provided which involves passing reactant streams comprising (a) the aromatic primary amine, mineral acid and water and (b) aqueous metal nitrite solution continuously through a tubular reactor and recovering the p-aminoazo compound from the exiting stream; the residence time in the reactor being less than about 10 minutes and the temperature within the reactor being between about 40° C. and about 100° C.

4 Claims, No Drawings

CONTINUOUS PROCESS FOR AMINOAZOBENZENE

This invention relates to an improved process for the manufacture of aromatic aminoazo compounds, particularly p-aminoazobenzene. More particularly, it concerns a highly efficient, continuous process for making the aromatic aminoazo compounds utilizing a single tubular reactor.

The aromatic aminoazo compounds are important industrial chemicals. They are employed as solvent dyes. For example, C.I. Solvent Yellow 1 (C.I. 11000) which is aminoazobenzene and C.I. Solvent Yellow 3 (C.I. 11160) which is aminoazotoluene are two of the widely used aromatic aminoazo compounds. The aminoazo compounds also serve as intermediates in the preparation of other azo dyes and chemicals, such as aromatic diamines and diisocyanates.

Aromatic aminoazo compounds have been known for a long time and much has been published on the preparation of these compounds. The basic steps of the principal process are diazotation of a primary aromatic monoamine to form a diazonium salt, coupling of the diazonium salt with the same amine to form a diazoamino compound, and rearrangement of the diazoamino compound under acid conditions to form an aminoazo compound. These reactions are shown in the following schematic representation for the production of aminoazobenzene from aniline:

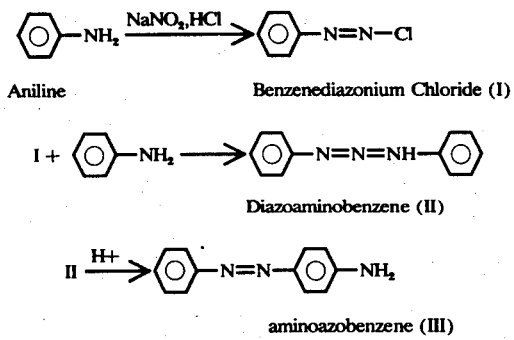

Heretofore, the above three reactions have been carried out stepwise or simultaneously, but always in batch-wise operations. The advantages of continuous processes in chemical manufacturing are well known, but until now a continuous process for preparing aromatic aminoazo compounds has not been devised.

In the past numerous processes have been known for the manufacture of either diazoaminobenzene or aminoazobenzene compounds from an aromatic amine and a nitrite, but these process suffer from one or more disadvantages. Some of the conventional processes use catalysts, such as the process of U.S. Pat. No. 2,894,942. These processes yield a product of varying quality because of the decrease in activity of the catalyst over a period of time with slight changes in the reaction conditions. The methods described in British Pat. No. 859,221 and U.S. Pat. No. 2,538,431 require reacting an aromatic amine and an inorganic nitrite over a period of more than 30 minutes and at a temperature below 40° C. to produce the intermediate product of diazomainobenzene. All the prior art methods for the production of aminoazobenzenes from an aromatic amine have been batchwise operations. Some of the methods necessitate the use of aniline hydrochloride as a starting material and/or more than one reactor to carry out the entire reaction. Others use an additional coupling agent for the conversion of the intermediate product of benzenediazonium chloride to another intermediate product of diazoaminobenzene.

It is the object of the present invention eliminate inate the disadvantages of the conventional processes. Thus, a specific object of the invention is to provide a continuous process for the preparation of aromatic aminoazo compounds. Another object is to provide a process for the preparation of aromatic amino compounds of high purity which is simpler, more efficient and less expensive than previously known processes.

Still another object of the invention is to provide a continuous process for the production of aminoazobenzene at a controlled temperature without the use of a catalyst.

A further object is to convert the intermediate product of diazonium salt to diazoaminobenzene without the use of an additional coupling agent.

A further object is to produce the intermediate product of diazoaminobenzene by reacting aromatic primary amine and an inorganic nitrite for a period of less than about 10 minutes and at a temperature of from 40° C. To 100° C. by utilizing the heat of reaction, thus reducing the cost of the ultimate aminoazobenzene product.

These and other objects are accomplished by the present invention which provides a continuous process for producing aminoazobenzenes in a tubular reactor as fully described hereinafter.

Broadly, in accordance with the process of the invention, a reaction stream comprising a large excess of an aromatic primary monamine, which is unsubstituted in the position para to the amino group, a mineral acid and a minimum amount of water is mixed with reaction stream comprised of an aqueous solution of an alkali metal nitrite. The combined premixed streams are then passed immediately through a tubular reactor. The exit stream from the reactor comprises aminoazobenzene compound, excess amine, excess acid, alkali metal salts and water. The aminoazobenzene compound is recovered from the exit stream by continuous neutralization of the excess acid with a caustic alkali followed by continuous separation of the organic layer containing the aminoazobenzene compound from the aqueous layer. The resulting solution of the aminoazobenzene compound in the organic layer of excess amine is separated into its components by conventional means or is used "as is" for further processing.

In the tubular reactor, a portion of the amine diazotizes to form the corresponding diazonium salt which instantaneously couples with the unreacted amine to form the diazoamino compound. The diazoamino compound rearranges under the reaction conditions to form the aminoazo compound.

The starting aromatic primary monamine is one which is unsubstituted in the position para to the amino group. It is preferably selected from the group consisting of aniline, o-toluidene, m-toluidene, 2,3-dimethylaniline, 2,5-dimethylaniline, 2-ethylaniline, 2-propylaniling, 2-chloroaniline, 3chloroaniline and mixtures thereof. The preferred aromatic primary monamine is aniline.

The mineral acid can be any strong acid. It is preferably selected from the group consisting of hydrochloric acid, hydrobromic acid, sulfuric acid and phosphoric acid. The preferred acid is hydrochloric acid because of its availability, cost, because it forms readily soluble amine hydrochloride salts (in the free amine), and because of the ease of eliminating the chloride salts formed during the course of the reaction from the ultimate aminoazo product.

The alkali metal nitrite can be any water soluble nitrite of an alkali metal. It is preferably selected from the group consisting of sodium nitrite, potassium nitrite, and lithium nitrite. The preferred nitrite is sodium nitrite.

The relative proportions of the reactants can be varied considerably, but for carrying out the reaction most efficiently the proportions set forth below are preferred. The ratio of the mole equivalents of the aromatic primary amine to the mole equivalents of the alkali metal nitrite is in the range of 3.5:1 to 20:1, preferably 7:1 to 12:1. The ratio of the mole equivalents of the mineral acid to the mole equivalents of the alkali metal nitrite is in the range of 1.2:1 to 9:1, preferably 1.5:1 to 3:1. The excess amine used acts as a solvent for the system and promotes rapid completion of the reaction. The excess mineral acid over that required to convert the alkali metal nitrite to nitrous acid catalyzes the rearrangement of the diazoamino compound to form the aminoazo compound.

The rate and efficiency of the reaction depends on the maximum temperature maintained in the reactor. The feed streams entering the tubular reactor immediately after mixing may be at ambient temperature, preferably in the range of 15° C. to 35° C. The maximum temperature within the reactor may be maintained, mostly by utilizing the positive heat of reaction, in the range of from 40° C. to 100° C., preferably from 70° C. to 90° C. At a maximum temperature below 40° C. the rate of reaction is too slow to be practical and economical, and at a maximum temperature above 100° C. the residence time in the reactor may be affected by the vaporization of water which may cause gas pockets to form. However, the reaction can be carried out at temperatures higher than 100° C. by the use of pressure.

The process of the invention can be carried out using varying concentrations of the reactants. The aromatic primary monamine can be used as it is commercially available or can be diluted with an inert organic solvent miscible with it. The mineral acid is used as an aqueous solution containing from about 20 to 50, preferably 30 to 40, weight percent of the acid. The alkali metal nitrite is also used as an aqueous solution containing from about 20 to 50, preferably 30 to 40, weight percent of the alkali metal nitrite. The aqueous caustic alkali used to neutralize the mineral acid present in the discharge stream of the reactor may contain about 10 to 60, preferably 20 to 30 weight percent of the caustic alkali, but is not limited to these concentrations.

The residence time in the tubular reactor for the conversion of the reactants to the aminoazo product depends on several factors, such as temperature within the reactor, relative proportions of the reactants, degree of uniform distribution of the reactants, concentrations of reactants etc. The residence time should be long enough to insure completion of the reaction. Generally, it is in the range of from 1 to about 10 minutes, usually from 2 to 6 minutes.

The yield and quality of the aminoazo compounds produced by the present continuous process are high as illustrated by the following examples. The advantages of the present process include among others that it requires no cooling to subambient temperatures, it is economical and it yields a aminoazo product of superior quality as a result of minimal by-product formation.

The invention is illustrated by the following examples.

EXAMPLE 1

A first reactant mixture containing 76.4 grams, 2.09 moles, 8.6 percent hydrogen chloride, 689 grams, 7.32 moles, 76.3 percent aniline and 134.5 grams, 15.1 percent water was metered at a rate of 891 grams per minute at a temperature of 25° C. to a mixing zone where it was mixed with a second reactant mixture of 71.5 grams, 0.04 moles, sodium nitrite in 106 grams water (40 percent by weight) metered at a rate of 177.5 grams per minute at 25 ° C. The combined premixed streams at 25 ° C. containing a mole ratio of aniline:hydrogen chloride:sodium nitrite of 7:21, were immediately metered to a tubular reactor where they reacted during a residence time of 5.8 minutes, reaching a maximum reaction temperature in the tubular reactor in the range 89° C. to 94° C. to form aminoazobenzene. The product stream from the tubular reactor was cooled, the excess acid neutralized with sodium hydroxide and the aminoazobenzene recovered from the reaction mixture in 91 percent yield calculated on the sodium nitrate used.

EXAMPLE 2

A first reaction mixture containing 68.9 grams, 1.88 moles, 6.95 percent hydrogen chloride, 794 grams, 8.54 moles, 80.5 percent aniline and 1.23 grams, 12.55 percent water was metered at a rate of 986 grams/min. at a temperature of 35° C. to a mixing zone where it was mixed with a second reactant mixture of 65.5 grams, 0.95 mole, sodium nitrite in 97 grams water (40.3 percent by weight), metered at a rate of 162.5 grams/min. at 35°C. The combined premixed streams at 35° C., containing a mole ratio of aniline:HCL: sodium nitrite of 9:2:1, were immediately metered to a tubular reactor where they reacted during a residence time of 5.3 minutes, reaching a maximum temperature in the tubular reactor in the range 86° C. to 91° C . to form aminoazobenzene. The product stream from the tubular reactor was cooled, the excess acid neutralized with sodium hydroxide and the aminoazobenzene recovered from the reaction mixture in 92 percent yield.

I claim:
1. A continuous process for the preparation of a carbocyclic aromatic aminoazo compound comprising the steps of (1) intimately mixing a reactant stream containing a large excess of a carbocyclic aromatic primary amine, unsubstituted in the position para to the amino group, a mineral acid and water, with a reactant stream containing an aqueous solution of an alkali metal nitrite, each of said reactant streams having been separately heated to a temperature in the range of 10° C. to 40° C. and the combined mixed streams containing a mole ratio of primary amine to mineral acid to alkali metal nitrite in the range of 3.5—20:1.2—9:1, (2) immediately passing said premixed reactant streams directly to a tubular reactor, at a rate such as to provide a residence time in said reactor of from about 1 to 10 minutes, wherein said reactant streams react to form said aminoazo compound at a temperature in the range of 40° C. to 100° C., said temperature resulting solely from the heat of reaction, (3) neutralizing the reaction product stream, containing said aminoazo compound as the acid salt, with an aqueous alkali metal hydroxide, (4) separating the resulting organic phase from the aqueous phase, and (5) recovering said aromatic aminoazo compound from the organic phase.

2. The process of claim 1 wherein said primary aromatic amine is aniline, said mineral acid is hydrochloric acid and said alkali metal nitrite is sodium nitrite.

3. The process of claim 2 wherein the ratio of aniline:HCL:NaNo$_2$ is 3.5–20:1.2–9:1.

4. The process of claim 2 wherein said ratio is 7–12:1.5–3:1.

* * * * *